United States Patent [19]

Krenzler

[11] Patent Number: 5,660,421
[45] Date of Patent: Aug. 26, 1997

[54] PROSPECTOR'S SHOVEL AND CREVICING TOOL

[76] Inventor: Leo M. Krenzler, 19550 Pacific Hwy S., Ste. 202, Seattle, Wash. 98188

[21] Appl. No.: 759,365

[22] Filed: Nov. 1, 1996

[51] Int. Cl.⁶ .................................................. A01B 1/02
[52] U.S. Cl. .................................................. 294/51; 294/55
[58] Field of Search ............................ 294/1.3, 9, 10, 294/49, 50, 50.7, 51, 55; 7/114, 116; 15/105, 257.1, 257.3, 257.4, 257.6; 141/108, 109, 390, 391; 172/375, 371; 209/417–419

[56] References Cited

U.S. PATENT DOCUMENTS

| | | | |
|---|---|---|---|
| 192,987 | 7/1877 | Griffiths | 294/55 |
| 220,576 | 10/1879 | Chilis | 294/55 X |
| D. 255,951 | 7/1980 | Halls et al. | 294/55 X |
| D. 337,244 | 7/1993 | Kilham | 294/55 X |
| 3,255,570 | 6/1966 | Weimer | 294/55 X |
| 3,490,501 | 1/1970 | Marem et al. | 294/55 X |
| 4,126,346 | 11/1978 | Burns | 294/55 |
| 5,345,642 | 9/1994 | Faldetta | 294/55 X |

FOREIGN PATENT DOCUMENTS

| | | | |
|---|---|---|---|
| 501202 | 7/1930 | Germany | 294/55 |
| 612851 | 11/1948 | United Kingdom | 294/55 |

*Primary Examiner*—Johnny D. Cherry
*Attorney, Agent, or Firm*—Kathleen T. Petrich

[57] ABSTRACT

A prospector shovel and crevicing tool (10) having a first scoop (12) and a second scoop (14). Both scoops have a rigid tubular sidewall (16, 24), a closed end (18, 26), and an open end (20, 28). The closed ends (18, 26) abut each other to form one tool that has a scoop on each end that can be used to hold gold ore or to crevice rocks and other debris. Each open end (20, 28) of its respective scoop forms an angle ($\propto$, $\phi$) with its respective sidewall (16, 24). In preferred form, the first and second scoops (12, 14) angularly abut at angle ($\theta$, $\theta'$) to provide better leverage for scooping in conjunction with the prospector's use of the second scoop as a handle. The diameter (d1) of the first scoop (12) is larger than that of the diameter (d2) of the second scoop (14). A hook (42) having two ends (44, 46) is fixedly attached to the first and second scoop in order to provide the prospector a way to carry tool (10) on the prospector's belt or on one of the prospector's belt loops or other equipment. A neoprene handle grip (48) surrounds the sidewall (24) of the second scoop (14) for ease in handling.

12 Claims, 3 Drawing Sheets

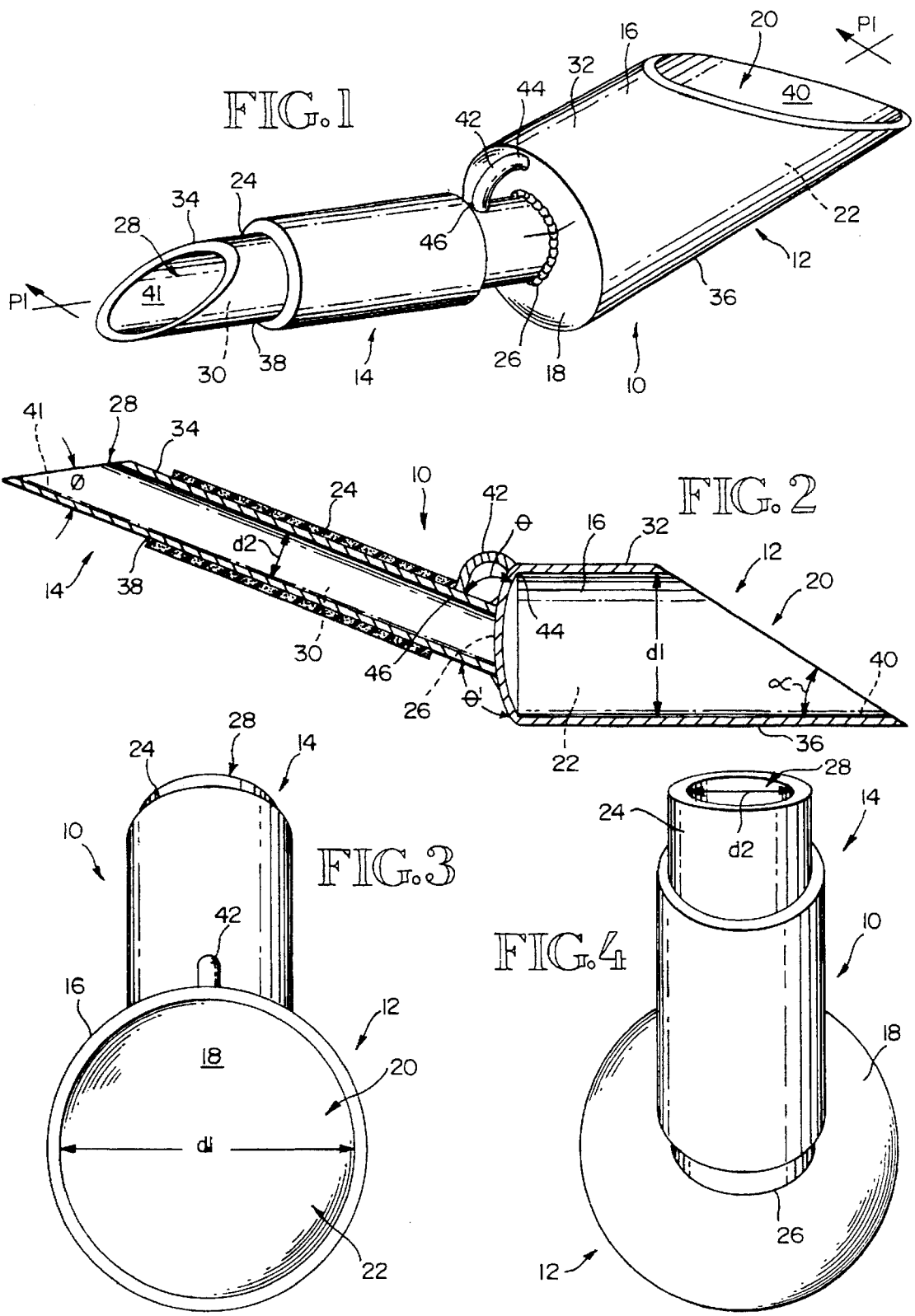

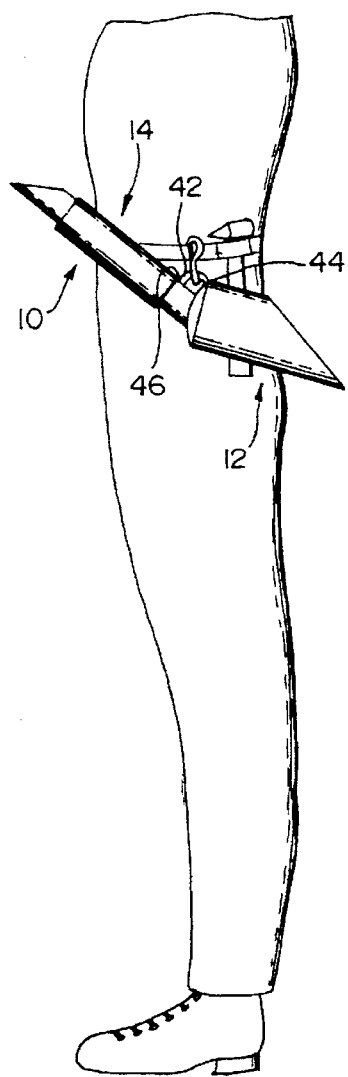
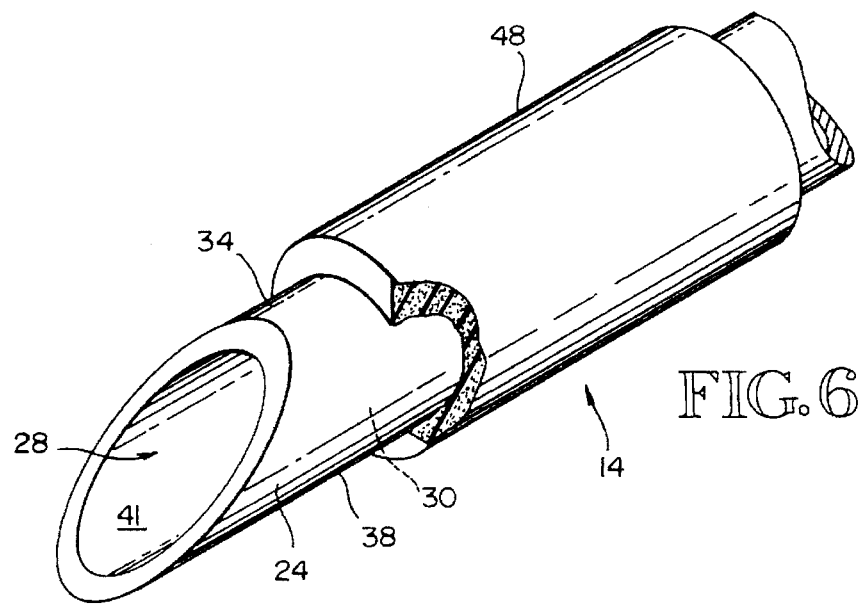

PROSPECTOR'S SHOVEL AND CREVICING TOOL

TECHNICAL FIELD

The present invention relates to a one-piece prospector's shovel tool that provides a shovel at one end and a crevicing tool at the other end. More specifically, the tool of the present invention relates to a first scoop having a closed end and a second scoop having a closed end where the two closed ends of each scoop are joined together to form one tool that can shovel and/or crevice at each end while the second scoop also acts as a handle.

BACKGROUND OF THE INVENTION

Prospectors have been using shovels and crevicing tools to scoop out black sand/dirt or crevice out rocks and other debris during prospecting activities involving gold or other valuable ore. Typically, a prospector will use a shovel to scoop large amounts of black sand/dirt containing gold ore into a separator, such as the type disclosed in my U.S. Pat. Nos. 5,275,295 granted Jan. 1, 1994, and entitled "Rotating Gold Pan For Separating Gold Particles From Ore" and 5,273,165 granted Dec. 28, 1993, and entitled "Rotating Gold Pan For Separating Gold Particles From Ore." Additionally, prospectors also need sharp crevicing tools to pry rocks and other material to access black sand. However, a prospector is usually out in a distant stream far away from his or her vehicle. Hence, the prospector needs to hike to the stream or prospecting area with all his or her gear. It, therefore, becomes advantageous for the prospector to carry less, especially if one tool can provide the function of a shovel and a crevicing tool. In addition, it would be beneficial to have a tool that can be easily hooked to the prospector's belt or other articles of wear in order to leave the prospector's hands free to carry larger equipment, such as the separator.

SUMMARY OF THE INVENTION

The present invention is a prospector's shovel and crevicing tool that includes a first scoop and a second scoop. Both the first and second scoops have a rigid tubular sidewall, a closed end and an open end. Each open end forms an angle with its respective sidewall. The closed ends of the first and second scoops abut each other so that the open ends of the first and second scoops are opposite each other. The diameter of the first scoop is larger than that of the diameter of the second scoop.

In preferred form, the closed ends of the first and second scoop angularly abut each other such that the open ends of the first and second scoops are opposite and laterally offset from each other. The angle that the closed ends of the first and second scoop abut is in the range of 70-90 degrees from vertical.

According to another aspect of the invention, the angle of the open end of the first scoop is in the range of 20-40 degrees. The angle of the open end of the first scoop creates a short side and a long side respective to it's tubular sidewall. The short side is preferably approximately ⅓ the length of the long side.

Additionally, the angle of the open end of the second scoop is in the range of 20-40 degrees. The angle of the second scoop creates a short side and a long side respective of it's tubular sidewall such that the short side is at least ⅔ the length of the long side.

According to another aspect of the invention, the tool of the present invention is symmetrical about a plane that divides the tool longitudinally such that the angles of the open ends of the first and second scoops are angled with respect to each other.

In preferred form, the sidewall of the second scoop is twice as long as that of the sidewall of the first scoop. The sidewall is preferably of a length to accommodate two hands wherein each hand is adjacent the other in a side-by-side fashion surrounding the sidewall.

The tool of the present invention is easier to carry because the tool further comprises a hook having a first end and a second end wherein the first end is fixedly attached to the first scoop and the second end is fixedly attached to the second scoop. An opening is defined by the hook, the first scoop and the second scoop. The hook may be carried on a prospector's belt loop to aid the prospector in carrying the tool or to have the tool in an easily accessible place when the tool is not being used.

Another feature of the invention includes a high coefficient of friction grip, such as neoprene, to surround the sidewall of the second scoop to provide cushioning and a way to better hold the handle.

These and other features will be more fully discussed and shown in the attached drawing, the best mode of the invention, and the following claims.

BRIEF DESCRIPTION OF THE DRAWING

Like reference numerals are used to indicate like parts throughout the various figures of the drawing, wherein:

FIG. 1 is pictorial view of the tool of the present invention showing a first scoop and an abutting second handle scoop;

FIG. 2 is a sectional view shown substantially along P1—P1;

FIG. 3 is a right end elevational view of the present invention;

FIG. 4 is a left end elevational view;

FIG. 5 is a pictorial view of the tool attached to a prospector's belt loop;

FIG. 6 is a fragmentary pictorial view of a grip on the second handle scoop.

BEST MODE OF THE INVENTION

Figure 7:
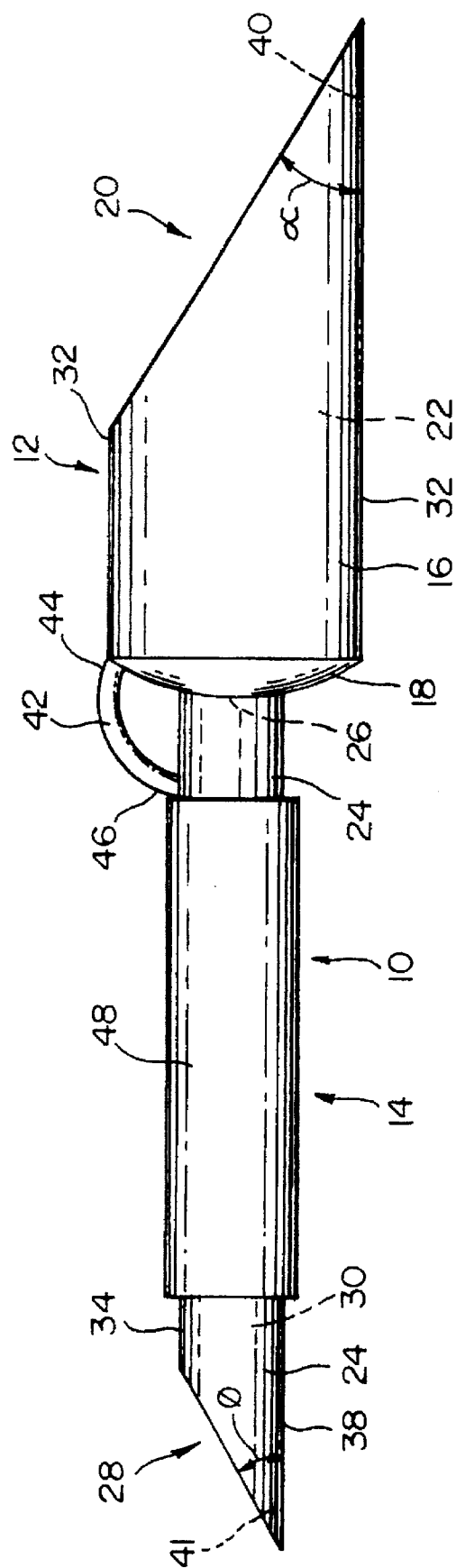
FIG. 7 is an alternate embodiment of the present invention.

Referring to FIGS. 1–3, the present invention is a prospector's shovel and crevicing tool 10. The tool may be used for shoveling and crevicing under water, as well as dry ground. Tool 10 includes a first scoop 12 and a second scoop 14.

The first scoop 12 has a rigid tubular sidewall 16, a closed end 18, and an open end 20. The tubular sidewall 16 and the closed end 18 define an opening 22 that allows the prospector to hold and move gold ore into a separator that separates gold particle from gold ore, such as the kind disclosed in my aforementioned U.S. Pat. Nos. 5,275,294 and 5,273,165. The closed end 18 includes a slightly outwardly bowed curve to provide strength, as well as aesthetic appeal to the first scoop.

The open end 20 forms an angle α with sidewall 16. Angle α, which is preferably in the range of 20 to 40 degrees as measured from horizontal, creates a short side 32 add a long side 36 of the tubular sidewall 16. The long side 36 provides a sharp pointed surface 40 to crevice, if needed, as well as to scoop gold ore. In preferred form, short side 32 is approximately ⅓ to ½ of the length of long side 36.

Referring now to FIGS. 1, 2 and 4, the second scoop 14 has a rigid tubular sidewall 24, a closed end 26, and an open end 28. Tubular sidewall 24 and closed end 26 define an opening 30 that also allows the prospector to hold and move gold ore into the separator, as well as crevice or pry rocks and other debris during prospecting. Tubular sidewall 24 of the second scoop is generally at least twice as long as that of tubular sidewall 16 of the first scoop.

The open end 28 of the second scoop forms an angle φ with sidewall 24. Angle φ is similar to that of angle α in that angle φ is preferably in the range of 20 to 40 degrees as measured from horizontal. Angle φ's relation to sidewall 22 are such that a short side 34 and a long side 38 of sidewall 22 are created. The long side provides a sharp pointed surface 41 to crevice or pry sharp items, such as a rock. Additionally, surface 41 provides a surface to scoop gold ore into opening 30. In preferred form, short side 34 is at least ⅔ the length of long side 38.

The closed ends 18 and 26 of the first and second scoops are adjoined to each other such that open ends 20, 28 are opposite each other. In this manner, the second scoop acts as the tool's handle. Thus, the two scoops form one tool to carry, as opposed to two separate tools. The curved closed end 18 of the first scoop provides added strength to the integrity of the tool when force is applied downwards on the first scoop from the handle during shoveling.

In preferred form, the adjoining closed ends 18, 26 angularly abut each other as shown in FIG. 2 at acute angle θ and obtuse angle θ'. Although many angles can be used, it is preferred that the acute angle be approximately in the range of 70–90 degrees. The obtuse angle is approximately the difference between the acute angle θ and 180 degrees. Thus, open ends 20, 28 are laterally offset from each other. In this manner, tool 10 is slightly more compact, which makes tool 10 easier to carry. Additionally, the abutting angle θ,θ' provides easier shoveling or crevicing access in conjunction with the natural curve of the human elbow. In preferred form, first scoop 12 and second scoop 14 are welded together at their respective closed ends 18, 26. However, tool 10 may also include an alternate tool 10' that has no abutting angle θ, such that the first scoop and second scoop form a straight member, as shown in FIG. 7.

All of the tool's major angles α, φ, θ, and θ' are in the same plane as shown by plane P1 that divides tool 10 longitudinally, as best shown in FIGS. 1 and 2. Tool 10 is symmetrical about P1. As best shown in FIG. 2, the angles α and θ of the first and second scoops, respectively, are angled with respect to each other in plane P1.

Referring to FIGS. 3 and 4, diameter d1 of the first scoop is preferably at least twice as large in preferred form as that of the diameter d2 of the second scoop in order to maximize the varying functions of the first scoop in relation to the second scoop. In preferred form, diameter d1 is approximately 3½ inches and diameter d2 is approximately 1⅜ inches. However, the invention may also encompass diameters for both the first and second scoops of varying sizes.

Referring to FIG. 5, a hook 42 having two ends 44, 46 is fixedly attached to tool 10 to provide a handle to easily carry the tool onto the prospector's belt or onto one of the prospector's belt loops, or other place on the prospector's clothing or equipment. Hook end 44 is attached to first scoop 12 and hook end 46 is attached to second scoop 14. In preferred form, hook end 44 is attached to the first scoop's closed end 18 and hook end 46 is attached to sidewall 24 of the second scoop at acute angle 8. However, the hook may be attached to the first and second scoops at the obtuse angle θ', (not shown), as well. Hook 42 may be welded to the first and second scoops 12, 14, or it may be attached through other well known mechanical means such as through a bolt. The hook 42 may affix to a standard commercial clip of the type that is commonly used to hook a set of keys to a belt loop. In this manner, the prospector can have both hands free when the tool is not in use, yet, the tool is still easily accessible.

The second scoop 14, is of a length to accommodate two hands, side-by-side. When tough rock or dirt is present, the prospector may wish to use both hands to apply greater force in crevicing or shoveling. As prospecting can be extremely labor intensive and hard on the prospector's hands, a handle grip 48, shown in FIG. 6, surrounds sidewall 24 of the second scoop to provide some measure of comfort to the user. The handle grip 48 may be made of neoprene or other man-made material to act as a cushion against the rigid sidewall and provide a better grip to the handle, especially when the tool is generally submersed in water, which can cause the handle to become slippery. Grip 48 may be a tubular sleeve or may be sprayed on or chemically bonded to sidewall 24.

In preferred form, tool 10 is made from steel with an anodized coating to retard rust. The tool may also be fashioned from stainless steel or heavy duty man-made material.

Tubular sidewalls 16, 24 of the first and second scoops are for best mode purpose; although the term tubular is preferably cylindric&l in this application, the term tubular encompasses cross sections of varying shapes, beyond a circle, such as oval, square or a triangle.

In addition to prospecting, the tool of the present invention may also be used for other earth moving projects, such as gardening or other construction or home projects.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A prospector's shovel and crevicing tool comprising:
   a first scoop having a rigid tubular sidewall, a closed end, and an open end, the open end being formed at an angle with respect to the sidewall;
   a second scoop having a rigid tubular sidewall, a closed end, and an open end, the open end being formed at an angle with respect to the sidewall;
   the closed ends of the first and second scoops abutting each other such that the open ends of the first and second scoops are opposite each other;
   and the diameter of the first scoop is substantially larger than the diameter of the second scoop.

2. The tool according to claim 1, wherein the closed ends of the first and second scoops angularly abut each other such that the open ends of the first and second scoops are opposite and laterally offset from each other.

3. The tool according to claim 2, wherein the closed ends of the second scoop abuts the closed end of the first scoop at an angle in a range of 15 to 25 degrees.

4. The tool according to claim 1, wherein the angle of the open end of the first scoop is in the range of 20 to 40 degrees.

5. The tool according to claim 1, wherein the angle of the open end of the first scoop creates a short side and a long side respective to it's tubular sidewall, such that the short side is approximately ⅓ to ½ the length of the long side.

6. The tool according to claim 1, wherein the angle of the open end of the second scoop is in the range of 20 to 40 degrees.

7. The tool according to claim 1, wherein the angle of the second scoop creates a short side and a long side respective to its tubular sidewall, such that the short side is at least two-thirds the length of the long side.

8. The tool according to claim 1, wherein the tool is symmetrical about a plane that divides the tool longitudinally such that the angles of the open ends of the first and second scoops are angled with respect to each other.

9. The tool according to claim 1, wherein the sidewall of the second scoop is twice as long as that of the sidewall of the first scoop.

10. The tool according to claim 1, wherein the sidewall of the second scoop is of a length to accommodate two hands, wherein each hand is adjacent each other in a side-by-side fashion surrounding the tubular sidewall.

11. The device according to claim 1, further comprising a hook having a first end and a second end, said first end being fixedly attached to the first scoop and the second end being fixedly attached to the second scoop, wherein an opening is defined by the hook, the first scoop and the second scoop.

12. The device according to claim 1, further comprising a grip having a high coefficient of friction surrounding the sidewall of the second scoop.

* * * * *